UNITED STATES PATENT OFFICE.

AUSTIN G. DAY, OF NEW YORK, N. Y.

IMPROVED ARTIFICIAL CAOUTCHOUC.

Specification forming part of Letters Patent No. 58,615, dated October 9, 1866; antedated September 29, 1866.

*To all whom it may concern:*

Be it known that I, AUSTIN G. DAY, of the city, county, and State of New York, have invented or discovered certain new and useful improvements in compositions of matter to be used as substitutes for caoutchouc or india-rubber, which substitute I denominate "Artificial Caoutchouc;" and I hereby declare that the following is a full and sufficient description thereof.

India-rubber composition, as known to the manufacturers, is prepared by mixing the raw caoutchouc and sulphur at a certain temperature with a certain portion of chalk, magnesia, and other diluting articles, which cheapen and at the same time deteriorate the manufacture; by which process of heating the caoutchouc forms a permanent combination with the sulphur, called by the chemist sulphuret of caoutchouc, or vulcanized rubber. During the process sulphureted hydrogen and sulphuret of carbon are eliminated, leaving the rubber in the vulcanized state.

The cost of crude rubber having increased very much operated as a strong inducement to seek means to procure a substitute. I have given much attention to the subject for many years, and have largely experimented thereon, and my labors have been at last crowned with success. I have been able to sulphurize vegetable and mineral oils in connection with coal-tar, asphaltum, bitumen, &c. Each, however, requires a certain definite heat, higher or lower, according to the character of the material treated. For example, I have ascertained that if we mix and heat to the temperature of 260° Fahrenheit, and increasing the heat for an hour or more, one pound of coal-tar, one pound of cotton-seed oil, and one pound of sulphur, accompanied with suitable stirring, the semi-liquid mass will at length become thick and pasty, and on removing it from the vessel the product will be found soft and elastic, like vulcanized rubber.

My composition is prepared by combining several oily bodies together and heating them with resinous bodies first, and then with sulphur, to the required temperature and time to complete the sulphurizing.

As to the character of the ingredients treated, some are already in the liquid state, some liquefy at a slight elevation of temperature—as rosin, paraffine, stearic acid, &c.—while others—as asphaltum, shellac, and copal—require a high heat to bring them into the liquid state. As to the temperature to which the ingredients must be raised to undergo sulphurizing there is great diversity. Linseed-oil readily combines with sulphur at the moderate heat of 288° Fahrenheit, while castor-oil requires a heat of 320° Fahrenheit.

To obtain the best results the bodies to be treated should be liquefied before mixing, and in separate vessels, to insure a homogeneous composition. With regard to time required for sulphurizing, the lower the temperature at which the combination takes place the longer the time required for a perfect union, and the higher the heat at which the combination takes place—say between the melting and boiling point—the shorter the time required for a perfect union. The range of my experiments covesr the entire series of mineral and vegetable oils as combined with gum-resins and resinous compositions, which are principally commercial classes of substances; but, chemically considered, they are embraced in a classification much more intimate in their relations and on a broader basis. Both the oils and the resinous compounds are of analogous composition. They constitute a large class of chemical compounds called "hydrocarbons," composed mostly of the same elements. All, when heated to redness in close vessels, give off carbureted hydrogen, or illuminating-gas, and caoutchouc belongs to the same class. Each may be combined with sulphur, or vulcanized under favorable circumstances, giving rise to various grades of vulcanized products.

When Charles Goodyear discovered by accident in 1840, or thereabout, the sulphurization of caoutchouc, it was supposed this was the first case of the so-called vulcanization of a vegetable substance, and it was believed for a considerable time that this was the only case on record of such a result. But the sulphurizing of an oil was not new even at that time, although no one had applied the fact to any useful purpose. Nor is the vulcanization of any single oil of much practical value at the present day. To be of use in the arts it must be combined with a resinous body to give it body and character. It is improved by mixing it with another oil; but liquid coal-tar, asphaltum, bitumen, crude turpentine, or balsam are the best for giving body and character to the material. Although they are divided into several commercial classes, chemically they belong to a single class, and in their relations are intimately connected together. They constitute a large class of hydrocarbons having certain characters or properties in common. When subjected to a red heat in a close vessel they yield the carbureted hydrogen of our gas-works. They contain the same elements, and differ from each other mainly by the different proportions in which they are combined. Like caoutchouc, they are all capable of combining with sulphur, the combination being accompanied with the evolution of sulphureted hydrogen and sulphuret of carbon. Their character for combining sulphur also serves to fix their relations as belonging to a chemical class with common properties. The chemical constitution of these hydrocarbons is remarkable. In their natural state the carbon and the hydrogen are pretty equally balanced; but distillation of any one disturbs the balance and leaves the carbon in the distillate in excess and the hydrogen in deficiency. Thus the coal-tars, especially the heavy ones, have an excess of carbon; but the balance, I have discovered, may be restored by boiling it with a vegetable oil, which causes the excess of carbon to be precipitated, and the coal-tar is restored to the proper balance of its composition, in which state it seems to combine freely with the oil and with sulphur. I have availed myself of this property to purify the coal-tars and other similar hydrocarbons, and prepare them for this manufacture.

As to the character of the products which I manufacture, it is evident that so great a variety of crude materials, notwithstanding the equalizing effect of my purifying process, must give a great variety of manufactured products adapted to a great variety of uses.

It was not designed to give here a description of the individual products or all of their applications to the arts. It is sufficient to say it has flexibility and elasticity to answer all the necessary purposes. Its consistency can be further varied by varying the proportions of coal-tar and oils, and also by varying the time and intensity of the heat.

When these experiments were undertaken, some six or seven years ago, cheapness of raw material was the principal motive in making them. Caoutchouc may still be used for the finest work, while the factitious caoutchouc may be used for all heavy articles requiring a large weight of the raw material. Besides the gain of cheapness in the article and preserving the important properties peculiar to caoutchouc, I gain new qualities of equal and even greater value. The new product is more impervious to water—that is to say, water does not exist in it, while water adheres most pertinaciously to rubber. Again, while the new compound resists cold and heat changes, the native caoutchouc does not. It will resist decomposition even better, and its organic structure is more permanent and durable, as sun-light has little or no effect on it.

In selecting among all the hydrocarbons named that ingredient which seems adapted to the purpose designed, the materials resolve themselves into two classes, the oils and the resinous compounds. The oily hydrocarbons seem to be of an equibalanced composition of hydrogen and carbon, while the resinous compositions greatly vary in the relative proportions of carbon and hydrogen. Usually I find better results from mixing two or more oils and two or more resinous bodies than when one of each element is used alone. If light oil is used, that should be counterbalanced by a heavy hydrocarbon resinous body, as heavy coal-tar, heavy coal-oil, asphaltum, or bitumen. So when a heavy oil is used, lighter resinous bodies should be combined.

The process of mixing the ingredients of a composition is commenced by fixing on the oils to be used. In most cases a cheap vegetable oil will be selected, as linseed, cotton-seed, rape-seed, hemp-seed, or any other vegetable oil; and having mixed two or more in certain measures or weights, and heated them to the required temperature—say 300°—and add the resinous bodies and the sulphur, and heat to 260°, less or more, increase the heat to 300°, or higher, till sulphurization takes place. If in mixing and heating the oils and hydrocarbons, carbon separates to the bottom, the liquid part is poured off before the sulphur is added.

The following are specimens of compositions worked by my process, and are medium compositions.

A. Two parts, by weight, linseed-oil; one part cotton-seed oil; two parts petroleum; two parts raw turpentine; two parts sulphur. Time occupied, one hour.

B. Two parts linseed-oil; one part castor-oil; two parts liquid coal-tar; one part petroleum; two parts raw turpentine; two parts sulphur. Time occupied, thirty minutes.

C. Two parts linseed-oil; one part cotton-seed oil; one part peanut-oil; three parts light coal-tar; one part petroleum; one part spirits turpentine; one-half part crude turpentine; four parts sulphur. Time, thirty-five minutes.

D. One part cotton-seed oil; two parts linseed oil; one-sixth part of caoutchouc or gutta-percha; two parts heavy petroleum; two parts light coal-tar; one-half part raw turpentine; one part spirits turpentine; two parts sulphur. Time occupied, about one hour.

The above list are specimens taken at random out of one hundred and forty trials. The oils were generally heated by themselves, the resinous bodies commingled and heated, and the precipitated carbon separated, if any, before adding the sulphur; and when the materials are homogeneous the sulphur is added, and the heat continued till vulcanization is complete.

With regard to the oils, vegetable and mineral have been mostly relied on, though by no means exclusively, for I have tried with success animal oils and fatty bodies; but these are much improved by purification. Thus stearic is good, while common tallow will not do at all.

What I claim as my invention, and desire to secure by Letters Patent, is—

Mixing, heating, and sulphurizing vegetable and mineral oils, in combination with gum-resins and resinous compounds, to form a composition to be used as a substitute for caoutchouc or india-rubber, substantially in the manner and for the purpose herein set forth.

AUSTIN G. DAY.

Witnesses:
 L. D. GALE,
 A. G. DeWOLFE.